(12) United States Patent
Burg

(10) Patent No.: US 7,017,505 B2
(45) Date of Patent: Mar. 28, 2006

(54) SHIP WITH WAVE ENERGY ENGULFING PROPULSORS

(76) Inventor: Donald E. Burg, 15840 SW. 84 Ave., Miami, FL (US) 33157

( * ) Notice: Subject to any disclaimer, the term of this patent is extended or adjusted under 35 U.S.C. 154(b) by 0 days.

(21) Appl. No.: 11/109,132

(22) Filed: Mar. 31, 2005

(65) Prior Publication Data

US 2006/0005756 A1    Jan. 12, 2006

Related U.S. Application Data

(63) Continuation-in-part of application No. 10/827,568, filed on Apr. 19, 2004, now abandoned, and a continuation-in-part of application No. 10/846,127, filed on May 14, 2004, now abandoned.

(51) Int. Cl.
*B63B 1/34* (2006.01)
(52) U.S. Cl. .................................. 114/67 A
(58) Field of Classification Search ............... 440/38; 114/67 R, 67 A
See application file for complete search history.

(56) References Cited

U.S. PATENT DOCUMENTS 3,342,032 A * 9/1967 Cox et al. ..................... 60/221
5,575,232 A * 11/1996 Kato et al. ................ 114/67 A \* cited by examiner

*Primary Examiner*—Ed Swinehart

(57) ABSTRACT

Presented is a water propulsion system for ships that enhances the efficiency of both the water propulsor(s) and the ship itself. This is accomplished by location of water inlet(s) for the water propulsor(s) to take advantage of water flow characteristics around a secondary bow of the ship and also proximal a stern of the ship. A primary object is to reduce the energy of the bow and/or stern waves of the ship and hence reduce the ship's wave making resistance. A secondary object is to reduce the frictional resistance of the ship. The water propulsors are preferably electrically driven with built in stator field windings and armatured rotors. A bow oriented water propulsor(s) would preferably have its discharge into a gas cavity in the underside of the ship. Both bow oriented and stern oriented water propulsor(s) would optimally have steering and/or reversing mechanisms.

28 Claims, 7 Drawing Sheets

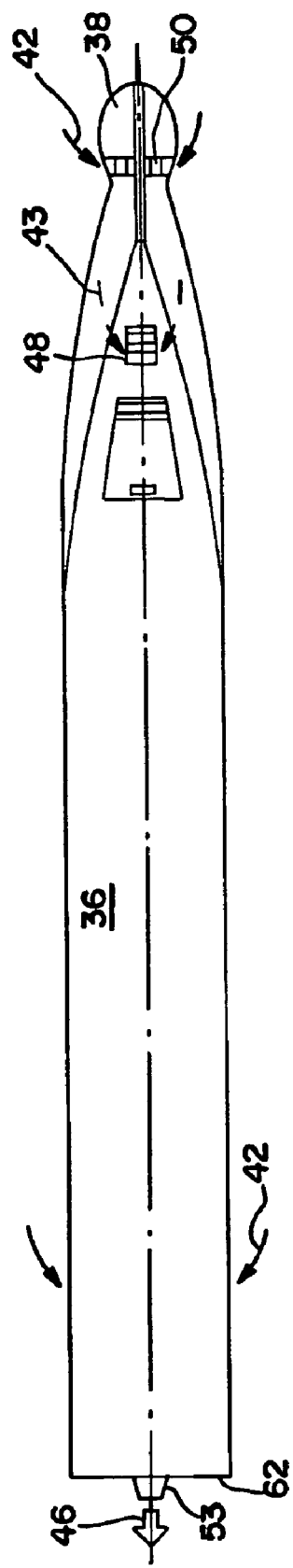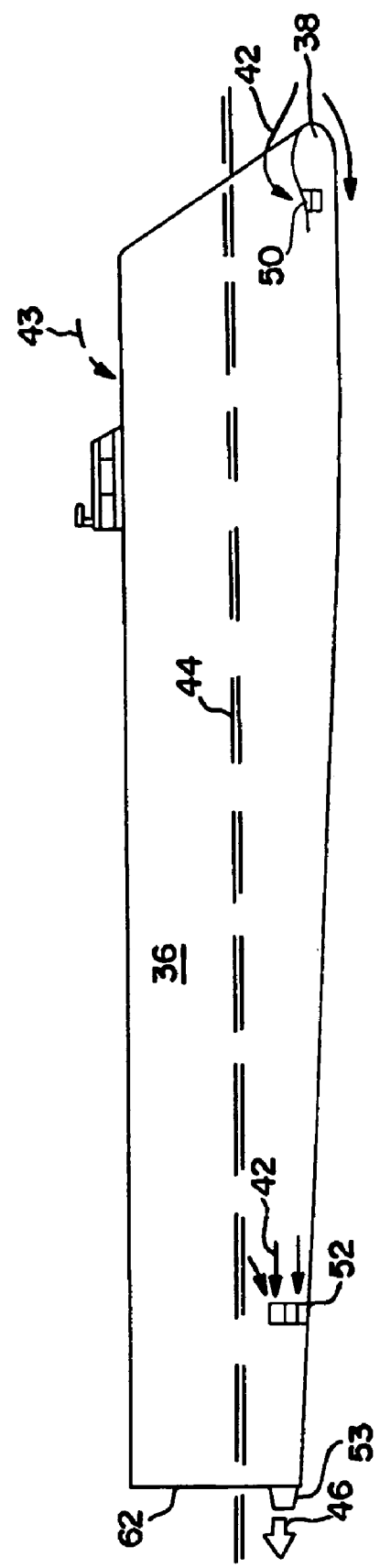
FIG. 9
FIG. 10

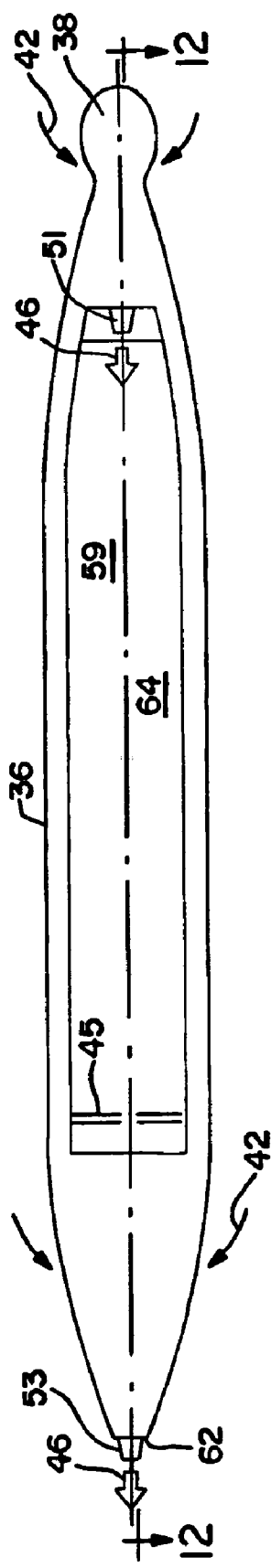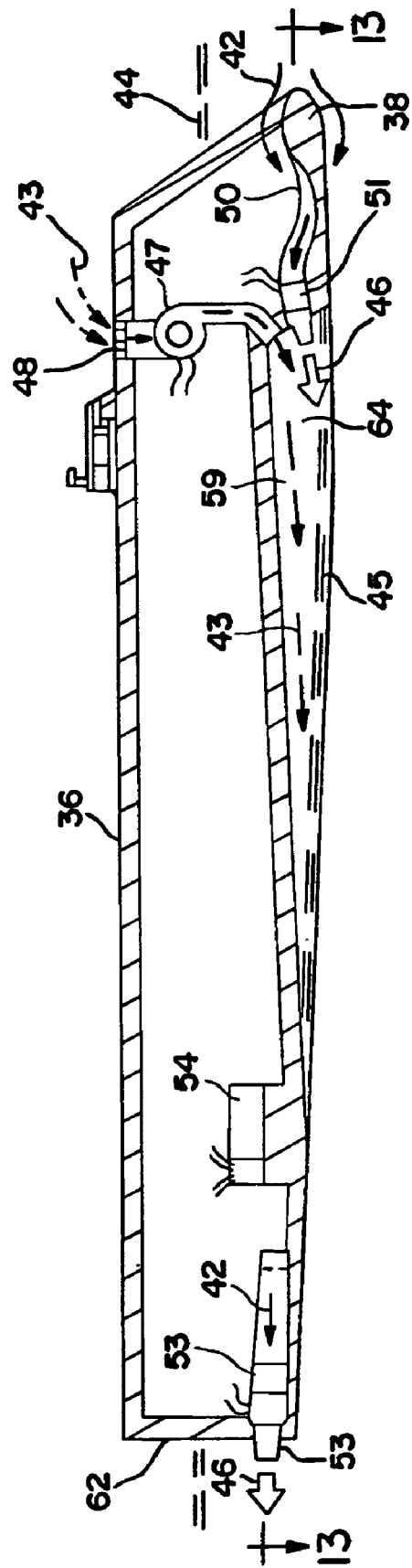

SHIP WITH WAVE ENERGY ENGULFING PROPULSORS

RELATED UNITED STATES DATA

This application is a continuation-in-part of Ser. No. 10/827,568 filed Apr. 19, 2004, now abandoned, and Ser. No. 10/846,127 filed May 14, 2004 now abandoned.

BACKGROUND OF THE INVENTION

Displacement hull ships are very efficient with high Lift/Drag (L/D) ratios up to a point where a very large wave drag component takes president. This is clearly shown upon examination of FIG. 1 of this application that shows the two predominant hydrodynamic resistance or drag components for typical displacement hull ships. These two drag components are friction drag and wave drag. It can be noted from FIG. 1 that friction drag is the predominant drag force up to about 18 knots for a ship with a waterline length of 400 feet (122 meters) and up to about 27 knots for a ship with a waterline length of 800 feet (244 meters). As speed is increased beyond those values, powering requirements become excessive for all practical purposes.

Various attempts have been made to reduce both the friction drag and wave drag of ships. However, though some small improvements have been made, speeds still remain embarrassingly slow for displacement hulls. One of the methods employed to reduce wave drag has been use of a bulbous bow that normally extends forward of the ship's main bow. The bulbous bow operates like a sphere submerged in a moving fluid where the oncoming water tends to adhere to forward and upper and side portions of the sphere and curves inward aft of the largest diameter of the sphere before breaking away in eddies. This inward curving of the fluid on the bulbous bow creates a significant hydrodynamic force on the energy of the bow wave of the ship thereby reducing the amplitude and hence the drag of the bow wave. Bulbous bows are most effective at higher speeds where the wave drag component predominates. Reductions of overall ship resistance values of 5 to 15 percent are noted for ships with well designed bulbous bows. It is of interest that bulbous bows can actually increase drag at low speeds since they increase wetted area friction.

Additionally, wetted area reducing air layers have been applied to the underside of ships and have been shown to reduce resistance by 10–15 percent or more in lower speed operation where friction drag predominates. However, the air layers, while still effective in reducing frictional resistance, are not noted to provide as high a percentage of efficiency improvement at higher speeds where the wave resistance predominates. These air layered ships are normally known as Air Lubricated Ships or simply ALS.

In summary, two successful methods of reducing hydrodynamic resistance of ships are in the prior art. The simple bulbous bow has met with the widest acceptance and is a common feature of larger ships particularly those running at higher speeds. The slightly more complicated ALS requires a blower. The ALS has met with more limited acceptance but does show promise especially for displacement hulls operating at lower speeds.

The instant invention combines bow oriented water propulsor(s) with variations of a secondary bow disposed proximal a lower portion of the ship's main bow. By having a water inlet for the bow oriented water propulsor(s) disposed properly in relation to the secondary bow it is possible to provide an enhanced hydrodynamic force that subtracts from the energy in the ship's bow wave. The effect is to reduce the amplitude and hence the resistance of the ship's bow wave. A related feature is to have a pressurized air or gas layer in a recess in the underside of the hull. This gas layer not only reduces wetted area friction of the ship but also allows the water discharge from the bow oriented water propulsor(s) to be discharged into gas rather than water. The effect of discharging the bow oriented water propulsor(s) into gas rather than water is an increase in the efficiency of the bow oriented water propulsor(s). A further advantage is that a steering and/or reversing system(s) may be applied to the bow oriented water propulsor(s). The steering and/or reversing system(s) would be internal to the pressurized gas recess when moving forward so they do not add to resistance. The advantage of having steering and/or reversing capabilities in the bow makes for a much more maneuverable ship at all speeds.

The instant invention also offers means to reduce stern wave resistance as well as separation and eddy resistance by providing stern oriented water propulsor(s) proximal to and forward of the stern of the ship. This is accomplished by having the stern oriented water inlet(s) properly located. Additionally, the water inlet(s) of these stern oriented water propulsor(s) are conceived so that they may intake the ship's boundary layer water which enhances the efficiency of those stern oriented water propulsor(s). The stern oriented water propulsor(s) would normally have steering and reversing capabilities.

A discussion of the instant invention and the advantages it offers is presented in detail in the following sections.

OBJECTS OF THE INVENTION

A primary object of the invention is to provide an improved means for integrating a water propulsion system into a ship.

A related object of the invention is that the water propulsion system include a first bow oriented water propulsor with a water inlet disposed, at least in part, proximal a forward end of a secondary bow of the ship.

A directly related object of the invention is that the secondary bow be disposed proximal a lower forward portion of a main bow of the ship and, when the ship is moving forward and the first bow oriented water propulsor is operating, water taken into the water inlet of the first bow oriented water propulsor generates an energy absorbing hydrodynamic force on a bow wave of the ship to thereby reduce the amplitude of said bow wave.

A further related object of the invention is that it may include a second bow oriented water propulsor.

It is a related object of the invention that bow oriented water propulsors have their water inlets proximal a bow of the ship but may themselves be disposed elsewhere in the ship.

It is another object of the invention that, at least in part, a surface of the secondary bow of the ship in way of a water inlet of the first bow oriented water propulsor be closer to a centerline of the secondary bow than forward of at least a majority of the water inlet.

It is a further object of the invention that the water inlet for the first bow oriented water propulsor be, at least in its majority, disposed above a horizontal centerline plane of the secondary bow of the ship.

It is also possible, dependent upon operating conditions of the ship, that an object of the invention be that the water inlet for the first bow oriented water propulsor be, at least in its majority, disposed below a horizontal centerline plane of the secondary bow of the ship.

It is yet another object of the invention that at least part of the enhanced hydrodynamic force exerted on the bow wave of the ship is due to acceleration of water passing inward curving surfaces of the secondary bow of the ship wherein said acceleration of water is at least in part caused by taking water into the water inlet of the first bow oriented water propulsor.

It is yet another object of the invention that the ship have a first gas cavity in its underside where said first gas cavity is pressurized with gas supplied by artificial gas pressurization means.

A related object of the invention is that the first bow oriented water propulsor may expel at least a majority of its discharge water into the first gas cavity.

An optional object of the invention is that the first bow oriented water propulsor may discharge all or part of its discharge water other than into a gas cavity.

Still another object of the invention is that it may include a first stern oriented water propulsor disposed such that a water inlet of said first stern oriented water propulsor is disposed, at least in its majority, aft of midship.

It is a directly related object of the invention that the water inlet of said first stern oriented water propulsor be disposed proximal to an inward turn of a bilge of the ship.

A related object of the invention is that the first stern oriented water propulsor ingest a majority of ship boundary layer water disposed horizontally in-line with and proximal the water inlet of the first stern oriented water propulsor.

A further related object of the invention is that the ship boundary layer water ingested into the first stern oriented water propulsor enhance the efficiency of the first stern oriented water propulsor.

Yet another related object of the invention is that water taken into the water inlet of the first stern oriented water propulsor create a hydrodynamic force on a stern wave of the ship resulting in a reduction in amplitude of the stern wave of the ship.

Still another related object of the invention is that water taken into the water inlet of the first stern oriented water propulsor create an inward directed hydrodynamic force on water flowing alongside the ship to thereby cause a reduction in separation effects of water flowing aft alongside the ship.

Another object of the invention is that there may be a second stern oriented propulsor.

Still another object of the invention is that the secondary bow of the ship may have, at least in part, a bulbous shape.

A further object of the invention is that the secondary bow of the ship may have, at least in part, a hydrofoil shape that is wider in cross dimension horizontally than vertically.

Another object of the invention is that the main bow of the ship, at least in its majority, may angle aft going upward from the secondary bow.

It is yet another object of the invention that the ship may include a main hull and stabilizing outrigger hulls.

Still another object of the invention is that the water propulsors may be driven by electric motors with electricity for the electric motors supplied by on-board generators.

It is a directly related object of the invention that the water propulsors may include built in stator electric field windings and armatured rotors so that the water propulsor itself incorporates an integral electric motor drive.

It is still another object of the invention that the first bow oriented water propulsor further include steering means where said steering means is, at least in its majority and with the ship moving forward and with the first bow oriented water propulsor producing forward thrust, disposed internal to a pressurized gas cavity in the underside of the ship's main hull.

It is still another object of the invention that the first bow oriented water propulsor further include reversing means where said reversing means is, at least in its majority and with the ship moving forward and with the first bow oriented water propulsor producing forward thrust, disposed internal to a pressurized gas cavity in the underside of the ship's main hull.

It is still another object of the invention that the first stern oriented water propulsor further include steering and/or reversing means.

It is a further object of the invention that the bow oriented and/or stern oriented water propulsors may be waterjets.

BRIEF DESCRIPTION OF THE DRAWINGS

FIG. 9 shows a topside view of a preferred embodiment of a monohull version of the instant invention.

FIG. 10 presents a starboard side view of the preferred embodiment of FIG. 9.

FIG. 11 gives a bottom view of the preferred embodiment of FIGS. 9 and 10. This view shows a preferred shape of a pressurized air or gas layer in the underside of the hull. Note that, while the preferred embodiment utilizes the converging inward toward the hull's centerline aft, it is quite within the scope and spirit of the invention, although not shown, to have the aft end of the hull remain parallel and full bodied or essentially so from about midship aft. In such case, the pressurized gas layer may be extended further aft than show in FIG. 11.

FIG. 12 gives a cross-section, as taken through vertical plane 12—12 of FIG. 11, that shows a preferred shape of the gas cushion recess in the hull's underside. Elements of the machinery are also shown.

DETAILED DESCRIPTION

Figure 1:
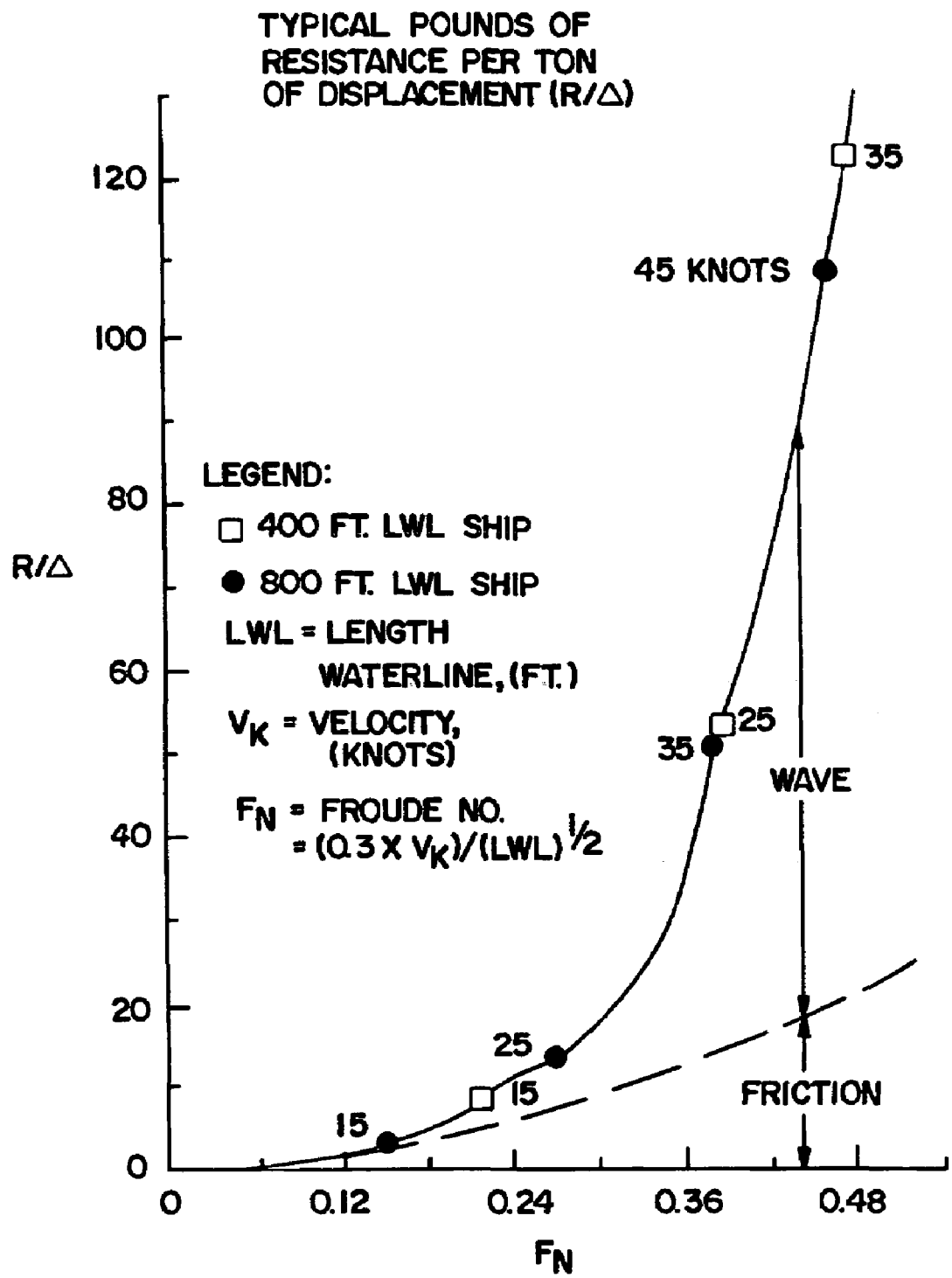
FIG. 1 present a graph that shows the effects of the two primary resistance factors for prior art ships. These primary resistance factors are friction and wave resistance. The graph presents them as Resistance per Ton of Displacement (R/Δ) vs. Froude Number (Fn) for some typical displacement ships. Corresponding speeds for 400 foot (122 meters) Length WaterLine (LWL) and 800 foot (244 meter) LWL ships are shown for illustrative purposes. The important thing to note here is that frictional resistance predominates at lower speeds while wave resistance predominates at higher speeds.

FIG. 1 present a graph that shows the effects of the two primary resistance factors for prior art displacement hull ships. These primary resistance factors are friction and wave resistance. The graph presents them as Resistance per Ton of Displacement (R/Δ) vs. Froude Number (Fn) for some typical displacement ships. By standard Naval Architecture terminology, $Fn=(0.3 \times Vk)/(LWL)^{1/2}$ where: Vk is ship velocity in knots and LWL is a ship's Length of WaterLine (LWL) in feet. Corresponding speeds for 400 foot (122 meter) LWL and 800 foot (244 meter) LWL ships are shown for illustrative purposes. The important thing to note here is that frictional resistance predominates at lower speeds while wave resistance predominates at higher speeds.

Figure 2:
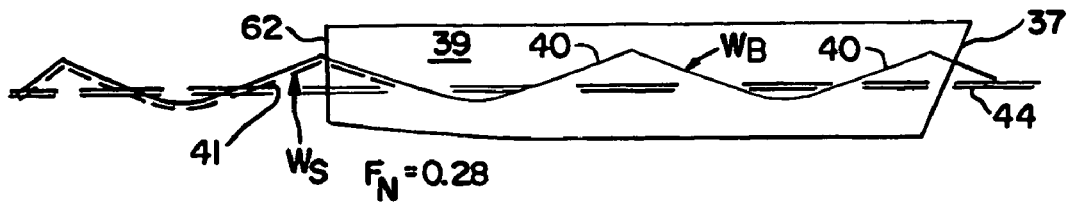
FIG. 2 presents typical wave patterns for a typical prior art displacement ship. These are presented at a Fn of 0.28 which corresponds to a speed of about 18 knots for the 400 foot (122 meter) LWL ship and 28 knots for the 800 foot (244 meter) LWL ship. Note that the bow wave (Wb) at this Fn=0.28 has a second crest at about mid-ship and the stern wave (Ws) superimposes upon the third crest of the Wb.

FIG. 2 presents typical wave patterns for a typical prior art ship 39. These are presented at a Fn of 0.28 which corresponds to speeds of about 18 knots for the 400 foot (122 meter) LWL ship and 28 knots for the 800 foot (244 meter) LWL ship. Note that the bow wave (Wb) 40 first forms proximal the main bow 37 and has a second crest at about mid-ship and the stern wave (Ws) 41 superimposes upon the third crest of the Wb for this Fn=0.28 condition. The ambient calm sea waterline 44 is also shown.

Figure 3:
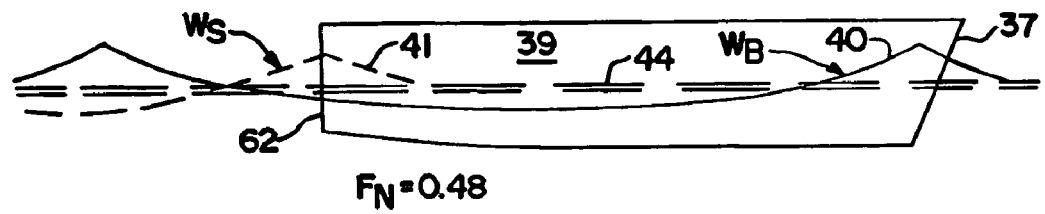
FIG. 3 shows the same typical prior art displacement ship of FIG. 2 but at a Fn of 0.48. This corresponds to about 33 knots for the 400 foot (122 meter) LWL ship and 45 knots for the 800 foot (244 meter) LWL ship. It is obvious from comparisons of the FIG. 1 frictional resistance values at a Fn of 0.28 with those at a Fn of 0.48 that frictional resistance predominates at lower speeds and wave drag at higher speeds.

FIG. 3 shows the same typical prior art ship 39 of FIG. 2 but at a Fn of 0.48. This corresponds to about 33 knots for the 400 foot (122 meter) LWL ship and 45 knots for the 800 foot (244 meter) LWL ship. It is obvious from comparisons of the FIG. 1 frictional resistance values at a Fn of 0.28 with those at a Fn of 0.48 that frictional resistance predominates at low speeds and wave drag at high speeds. Note that the second crest of the bow wave (Wb) 40 extends beyond the stern 62.

Figure 4:
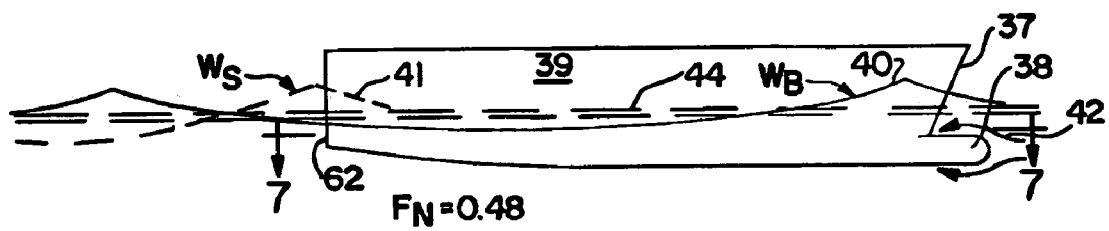
FIG. 4 shows the addition of a secondary bow below the main bow of the prior art ship of FIGS. 2 and 3. The most accepted secondary bow shape in the prior art is a bulbous shape and hence is generally called a bulbous bow. The prior art secondary bow reduces the amplitude of the bow wave by creating a hydrodynamic force that absorbs some of the potential energy of the bow wave thereby reducing bow wave (Wb) amplitude resulting in a reduction in overall wave resistance. The bulbous bow is mainly effective at higher speeds. It actually increases resistance at low speeds since it adds to wetted area and hence increases frictional resistance.

FIG. 4 shows the addition of a secondary bow 38 below the main bow 37 of the prior art displacement hull 39 of FIGS. 2 and 3. This prior art secondary bow 38 is many times called a bulbous bow due to its preferred bulbous shape. The bulbous bow 38 reduces the amplitude of the bow wave by creating a hydrodynamic force that absorbs some of the energy of the bow wave thereby reducing bow wave (Wb) 40 amplitude. The water flow pattern about the bulbous or secondary bow 38 is indicated by water flow arrows 42. This secondary bow 38 generated hydrodynamic force that absorbs energy of the bow wave results in a reduction in overall wave resistance of the ship. The bulbous bow 38 is mainly effective at higher speeds. The bulbous bow 38 can actually add some resistance at low speeds since it increases wetted area and hence frictional resistance.

Figure 5:
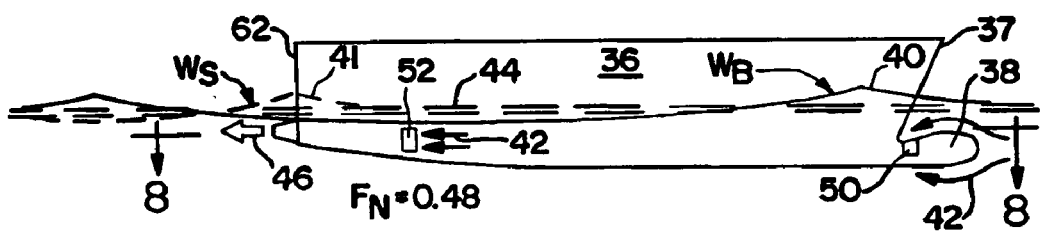
FIG. 5 presents a version of the instant invention where the secondary bow of FIG. 4 has been improved by addition of a bow oriented water inlet. That bow oriented water inlet accelerates the water passing over surfaces of the secondary bow to further add to the energy absorbing hydrodynamic force on the bow wave. This reduces the amplitude and hence the resistance of the bow wave (Wb) beyond that possible with a secondary bow that is not influenced by water flow accelerated by the instant invention's bow oriented water inlet. Further shown in FIG. 5 is a stern oriented water inlet that takes in water proximal the stern of the ship and thereby reduces the amplitude of the stern wave (Ws). Note the reductions in both the bow and stern waves compared to FIGS. 3 and 4 that show the prior art.

FIG. 5 presents a version of the instant invention's hull 36 where the secondary bow 38 of FIG. 4 has been improved by addition of a first bow oriented water inlet 50. That first bow oriented water inlet 50 accelerates the water passing over surfaces of the secondary bow 38 to further add to the energy absorbing hydrodynamic force on the bow wave (Wb) 38. This reduces the amplitude and hence the resistance of the bow wave (Wb) 38 beyond that accomplished by the prior art secondary bow 38 of FIG. 4 that has no water accelerating bow oriented water inlet 50. Further shown in FIG. 5 is a stern oriented water inlet 52 that takes in water proximal the stern 62 of the ship 36 and thereby reduces the amplitude of the stern wave (Ws) 41. Note the reductions in both the bow and stern waves compared to FIGS. 3 and 4 that show the prior art at the same Fn of 0.48.

Figure 6:
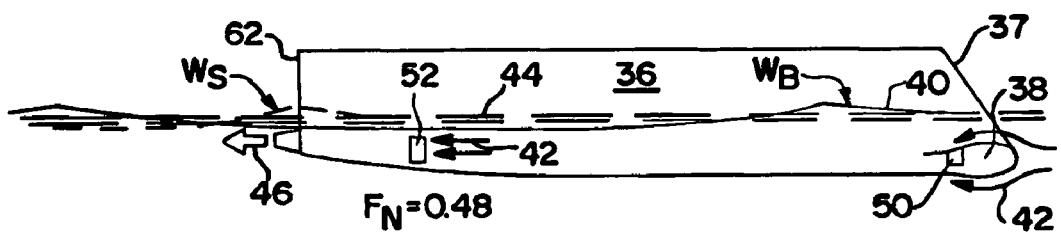
FIG. 6 shows yet a further enhancement to the instant invention where the main bow slopes aft. The benefit of this aft sloping main bow concept is to move the bow wave (Wb) further aft and to reduce its amplitude. The FIG. 5 main bow concept of the instant invention is very workable and certainly within the scope and intention of the instant invention, however, the preferred embodiment is the aft sloping main bow as shown in FIG. 6.

FIG. 6 shows yet a further enhancement to the instant invention where the main bow 37 37 slopes aft. The benefit of this aft sloping main bow 37 concept is to move the bow wave (Wb) 40 further aft and to reduce its amplitude. While the FIG. 5 main bow 37 variant of the instant invention is very workable and within the scope and intent of the instant invention, the preferred embodiment is as shown in FIG. 6.

Figure 7:
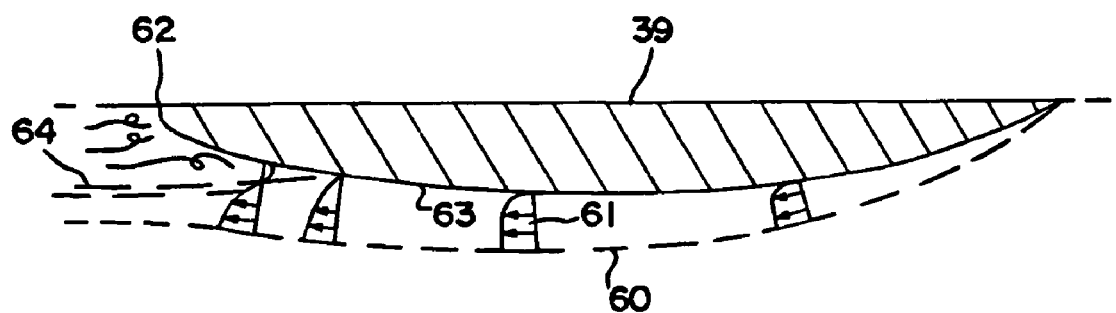
FIG. 7 presents a cross-section, as taken through horizontal plane 7—7 of FIG. 4, that shows the friction resistance generating boundary layer of a prior art displacement ship. Note the boundary layer separation aft where the bilge turns inward.

FIG. 7 presents a cross-section, as taken through horizontal plane 7—7 of FIG. 4, that shows the friction resistance generating boundary layer 60 of a prior art ship. Boundary layer velocity profiles 61 show that water next to the hull 39 surfaces have been accelerated by contact with the ship and are at or near ship speed while those at the outer limit of the boundary layer 60 are not effected by the ship's movement. Note the boundary layer 60 separation aft where the bilge line 63 turns inward going toward the stern 62 in this example. This flow separation proximal the stern 62 is indicated by flow separation line 64. The associated flow separation results in what are called separation and eddy resistance.

Figure 8:
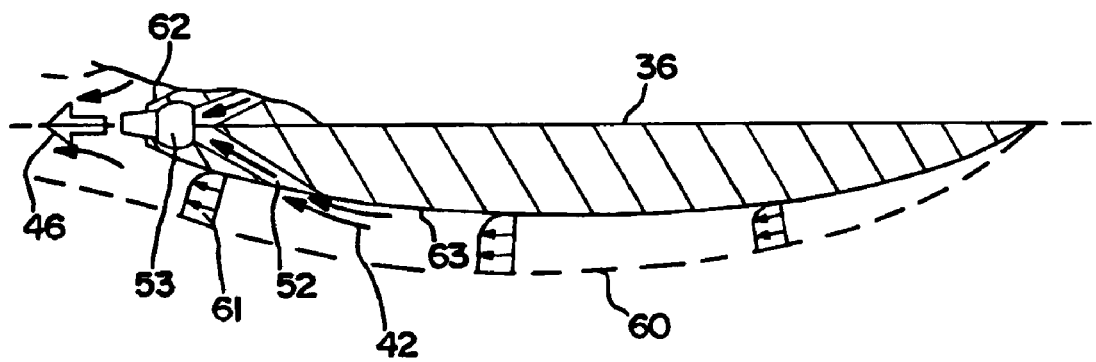
FIG. 8 presents a cross-section, as taken through horizontal plane 8—8 of FIG. 5, that shows how the stern oriented water inlet of the instant invention causes the flow to adhere to the hull aft of the inward turn of the ship's bilge. The advantage here is that separation and eddy resistance is greatly reduced.

FIG. 8 presents a cross-section, as taken through horizontal plane 8—8 of FIG. 5, that shows how the stern oriented water inlet 50 of the instant invention causes water flow 42 to adhere to the hull 36 aft of the inward turn of the ship's bilge line 63. The advantage here is that separation and eddy resistance is greatly reduced.

FIG. 9 shows a topside view of a preferred embodiment of a monohull version of the instant invention ship 36. Additional items shown here include a blower air inlet 48 and air flow arrows 43. The air inlet 48 is used when it is elected to employ a pressurized air or gas cavity in the underside of the instant invention ship 36. A stern oriented water propulsor 53 and its water discharge thrust arrow 46 are also shown.

FIG. 10 presents a starboard side view of the preferred embodiment of the instant invention ship 36 of FIG. 9. This shows the integrated bow and stern oriented water inlets 50 and 42.

FIG. 11 gives a bottom view of the preferred embodiment of the instant invention ship 36. This view shows a preferred shape of a pressurized air or gas layer recess 59 in the underside of the hull 36. Note that, while the preferred embodiment utilizes the converging inward bilge hull shape aft, it is quite within the scope and spirit of the invention, though not shown, to have the aft end of the ship 36 remain parallel and full bodied or essentially so from about midship aft. In such case, the pressurized gas layer 64 may be extended further aft than show in FIG. 11.

FIG. 12 gives a cross-section, as taken through vertical plane 12—12 of FIG. 11, that shows a preferred shape of the gas cushion recess 59 in the hull's underside. Elements of the machinery including a bow oriented water propulsor 51, air or gas pressurizing blower 47, electric generator 54, and stern oriented water propulsor 53 are also shown. This overall concept shows totally electrical powered propulsion machinery as is a preferred approach for both commercial and military ships due to its simplicity and compactness of design.

Figure 13:
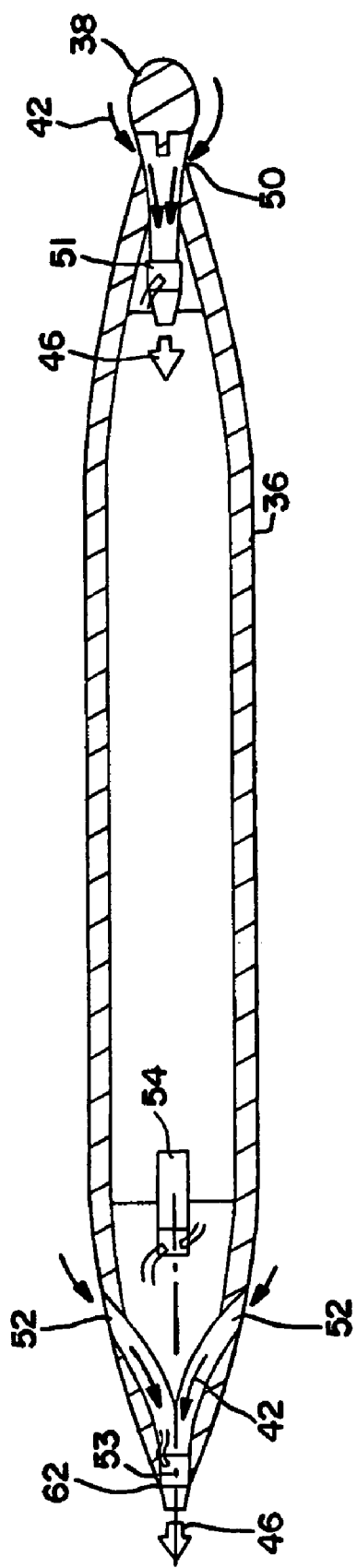
FIG. 13 presents a cross-section, as taken through horizontal plane 13—13 of FIG. 12, that shows a variation of propulsor water inlets and general machinery arrangements.

FIG. 13 presents a cross-section, as taken through horizontal plane 13—13 of FIG. 12, that shows propulsion water inlets and general propulsion machinery arrangements. Note that while only one bow oriented water propulsor 51 and one stern oriented water propulsor 53 are shown that any number of each may be utilized where application dictates.

Figure 14:
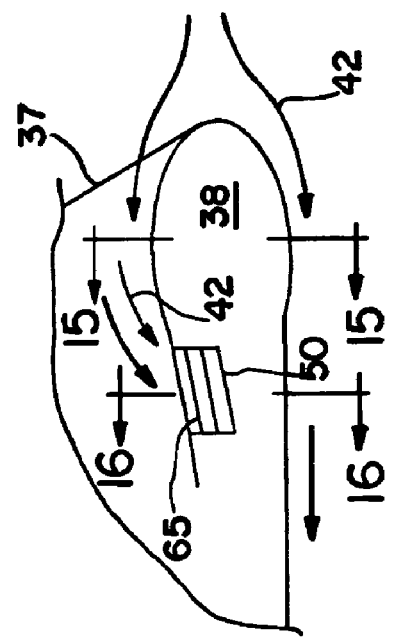
FIG. 14 presents a partial section enlarged view that shows the preferred embodiment of a secondary bow and a first bow oriented water inlet and how they relate to a main bow.

FIG. 14 presents a partial section enlarged view that shows the preferred embodiment of secondary bow 38 and bow oriented water inlet 50 and how they relate, in this variation, to a main bow 37 of the preferred embodiment of the instant invention.

Figure 15:
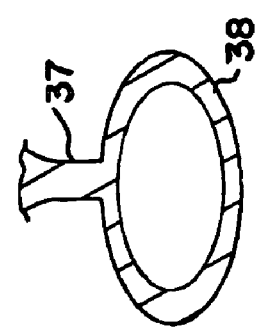
FIG. 15 gives a cross-section, as taken through vertical plane 15—15 of FIG. 14, that shows a preferred configuration for this area.

FIG. 15 gives a cross-section, as taken through vertical plane 15—15 of FIG. 14, that shows the preferred construction of the secondary bow 38 in this area. It is important to note that various secondary bow 38 shapes may be utilized and that all are considered within the spirit and scope of the instant invention. Shapes ranging from more or less rounded bulbous to hydrofoil shaped that are wider horizontally than vertically may be applied. A secondary bow vertical centerline plane 69 and horizontal centerline plane 68 are also shown.

Figure 16:
FIG. 16 presents a cross-section, as taken through vertical plane 16—16 of FIG. 14, that shows the first bow oriented water inlet proximal the secondary bow.

FIG. 16 presents a cross-section, as taken through vertical plane 16—16 of FIG. 14, that shows a bow oriented water inlet 50 proximal the secondary bow 38. Note the water inlet grille bars 65 used to prevent debris ingestion are employed here.

At this juncture it is appropriate to take a look at some of the predicted gains to be realized by incorporation of the instant invention propulsor(s) into a typical ship. Assuming a 400 foot (122 meter) ship of 12,000 long tons (12,190 metric tons) displacement we can make some comparisons. Referring back to FIG. 1 and looking at 25, 35, and 45 knot speeds, we can arrive at some approximate friction and wave resistance forces and then express these in terms of ideal power levels required to overcome these forces. As an example, these are summarized for the 400 foot (122 meter) ship at 12,000 long tons (12,190 metric tons) as follows:

| Velocity, Knots | 25 | 35 | 45 |
|---|---|---|---|
| Friction Energy-HP(KW) | 6,450(4,810) | 15,480(11,544) | 29,850(22,260) |
| Wave Energy-HP(KW) | 4,600(3,430) | 49,000(36,540) | 149,250(111,298) |

It is obvious from these numbers that our 400 foot (122 meter) LWL ship at 12,000 long tons (12,190 metric tons) displacement has a practical speed limit of about 25 knots where ideal powers of just over 11,000 HP (8,200 KW) are required to overcome Friction and Wave Energy. Going to 35 knots increases power to 65,000 HP (48,471 KW) and to 45 knots to 180,000 HP (134,228 KW). It is also to be noted that Friction Energy has increased by 240 percent over a speed increase from 25 to 35 knots and 463 percent over a speed increase from 25 to 45 knots. This is surpassed by Wave Energy that has increased by 1,065 percent over a speed increase from 25 to 35 knots and 3,244 percent over a speed increase from 25 to 45 knots. A second point to be noted is that Friction Energy is 140 percent of Wave Energy at 25 knots, 32 percent at 35 knots, and only 20 percent at 45 knots. All of this clearly points out that we need to be reducing Wave Energy to obtain high speeds (high Froude numbers) at acceptable power levels.

Assuming we can reduce the frictional drag force by ten percent by means of an air layer under the ship and reduce the wave drag force by fifty percent by use of the instant invention new wave energy absorbing propulsion system, the new ideal power or energy requirements are:

| Velocity, Knots | 25 | 35 | 45 |
|---|---|---|---|
| Friction Energy, New-HP(KW) | 5,805(4,329) | 13,932(10,389) | 26,865(20,034) |
| Wave Energy, New-HP(KW) | 2,300(1,715) | 24,500(18,270) | 74,625(55,649) |

The rational for assuming a ten percent reduction in frictional resistance by use of an air layer under the hull is established by preceding technology. The rational for assuming a fifty percent reduction in wave energy resistance is based on a series of iterations. First, to drive our 400 foot (122 meter) ship at 45 knots requires a total ideal power of over 100,000 HP (75,000 KW). This means that we would require about 40,000 HP (29,828 KW) in ideal power from the bow oriented propulsor(s) and 60,000 HP (44,743 KW) from the stern oriented propulsor(s).

The preceding values are the ideal power levels and do not account for propulsor or drive line inefficiencies. Taking those inefficiencies into account adds about 35 percent in the actual on-board propulsor engine power capabilities to overcome Friction and Wave Energies. Therefore, the actual on-board propulsor power requirements work out to about 61,538 HP (45,890 KW) for the bow oriented propulsor(s) and 94,673 HP (70,599 KW) for the stern oriented propulsor(s). So we are looking at a couple of 30,000 HP (23,372 KW) or so propulsors for the bow and two 45,000 HP (33,557 KW) or so propulsors for the stern.

It is apparent that such large water propulsors pump or absorb a tremendous amount of water flow. For example, a 30,000 HP (23,372 KW) waterjet has a water flow rate of about 400,000 cubic feet per minute (11,328 cubic meters of per minute) and two of those are prescribed for the bow alone in the example given. It is these tremendously huge propulsor water flows, combined ideally with the preferred embodiment secondary bow, and the fact that they offer huge energy absorbing hydrodynamic forces on the bow and stern waves that make the instant invention result in such greatly improved overall ship efficiencies.

In summary, regarding performance gains to be expected, reductions in overall power requirements at high speeds (high Froude numbers) in the fifty percent area are predicted for ships incorporating the instant invention.

Figure 17:
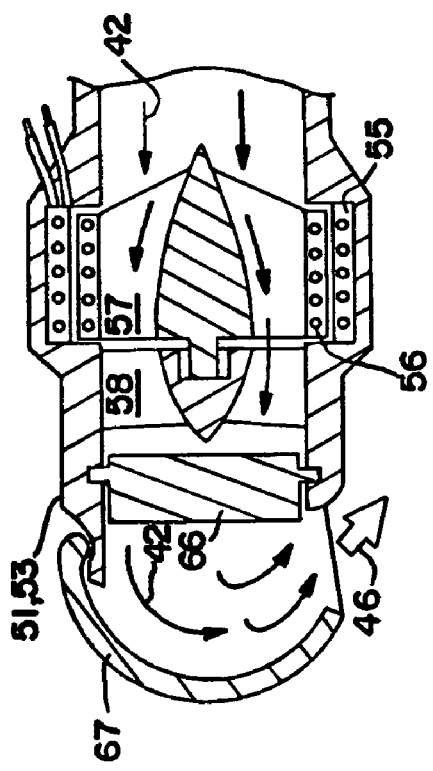
FIG. 17 presents a centerline cross-sectional view as taken through a vertical centerline plane of a preferred embodiment water propulsor. This design may be applied to the bow and/or stern oriented water propulsors. Note the stator electric field windings and the armatured rotor used here. This electric drive water propulsor would normally be a waterjet propulsor. Use of electric drive systems such as shown here results in compact lightweight drive systems that do not require gearboxes, drive shafts, or the like. Electric drive systems are gaining favor for both military and commercial ships. A steering and/or reversing system is also offered on the bow and/or the stern oriented water propulsor(s).

FIG. 17 presents a centerline cross section, as taken through a vertical centerline plane, of a preferred embodiment of the bow or stern oriented water propulsor 51, 53. Note the stator electric field windings 55 and the rotor armature 56 used here. Rotor vanes 57 and flow straightening stator vanes 58 are also shown. This electric drive water propulsor would normally be a waterjet propulsor. Use of electric drives system such as shown here results in compact lightweight drive systems that do not require gearboxes, drive shafts, or the like. Also depicted is a steering mechanism 66 and a reversing mechanism 67. The reversing mechanism 67 is actuated here such that it is in position to provide reversing thrust.

There is substantial advantage to placing a steering mechanism 66 and/or a reversing mechanism 67 of the bow oriented water propulsor 51 either partially or fully internal to the gas cavity 64. First, an advantage is seen when the ship is moving forward in that the steering mechanism 66 and/or reversing mechanism 67 of the bow oriented water propulsor 51 do not make water contact and therefore do not add to ship resistance. A second advantage is that discharging the water from the bow oriented water propulsor 51 into the gas layer 64 enhances the efficiency of the bow oriented water propulsor 51 since this approach avoids the turbulent mixing losses associated with discharge of water into a water medium. A steering mechanism 66 and/or reversing mechanism 67 would normally be applied to the stern oriented water propulsor 53 also.

Figure 18:
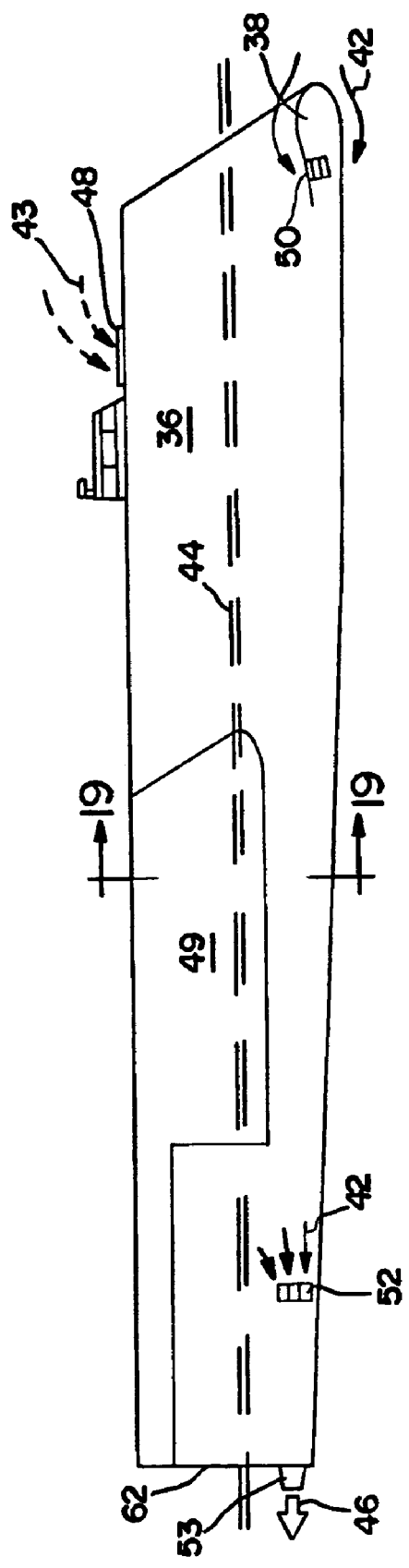
FIG. 18 is a similar starboard side view as presented in FIG. 10 but in this instance outrigger hulls have been added. The outrigger hulls provide stability and increased deck and cargo space. Two or more outrigger hulls may be employed.

FIG. 18 is a similar starboard side view of an instant invention ship 36 as presented in FIG. 10 but in this instance outrigger hulls 49 have been added. The outrigger hulls 49 provide added stability and increased deck and cargo space. Two or more outrigger hulls 49 may be employed.

Figure 19:
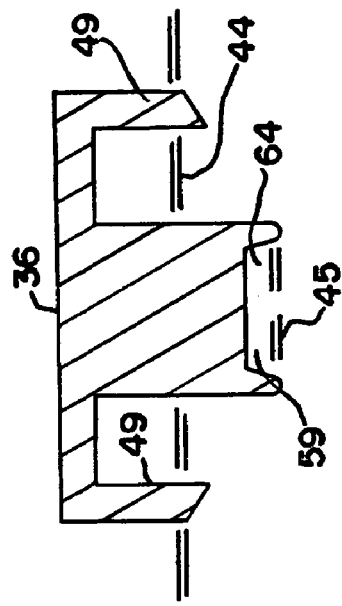
FIG. 19 gives a cross-section, as taken through vertical plane 19—19 of FIG. 18. This shows a preferred cross-section shape of a gas cavity and of outrigger hulls.

FIG. 19 gives a cross-section, as taken through vertical plane 19—19 of FIG. 18. This shows a preferred cross-section shape of a gas cavity recess 59 and of outrigger hulls 49. It is to be noted that, while preferred, use of a gas cavity recess 59 as presented here and elsewhere in this document is not necessary to the function of the instant invention. In such case where a gas cavity recess 59 is not used, it is possible for a bow oriented water propulsor to discharge its liquid to the side, rear, or other portions of the ship.

As a point of interest, the acronym SWEEP, derived from Ship with Wave Energy Engulfing Propulsors, has been coined for the instant invention. By dictionary definition, SWEEP means overwhelming victory.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved means for integrating a water propulsion system into a ship, the improvement comprising:
a first bow oriented water propulsor having a first bow oriented water inlet disposed, at least in part, proximal a lower forward portion of a bow of a main center hull of the ship and wherein, when the ship is moving forward and the first bow oriented water propulsor is operating, water taken into the first bow oriented water inlet generates a hydrodynamic force on a bow wave of said ship thereby reducing energy of said bow wave and wherein said first bow oriented water propulsor expels at least a majority of its discharge propulsive force water aft into a first open bottomed recess inset upward into the main center hull of the ship and wherein said first open bottomed recess is, at least in part, defined either side longitudinally by downwardly extending longitudinal portions of the main center hull and wherein a first open bottomed pressurized gas layer is formed in said first open bottomed recess and wherein said first open bottomed pressurized gas layer is supplied with gas from artificial gas pressurization means.

2. The improved means for integrating a water propulsion system into a ship of claim 1 wherein said first open bottomed recess is, at least in part, defined forward by a first step inset upward into a lower portion of the main center hull of the ship.

3. The improved means for integrating a water propulsion system into a ship of claim 1 which further comprises outrigger hulls disposed either side of the main center hull of the ship.

4. The improved means for integrating a water propulsion system into a ship of claim 1 wherein, as seen in a vertical transverse plane of the main center hull of the ship, a lower water contacting portion of the first open bottomed pressurized gas layer is horizontal over a least a majority of its width.

5. The improved means for integrating a water propulsion system into a ship of claim 1 wherein, as seen in a vertical longitudinal plane of the main center hull of the ship, a lower water contacting portion of the first open bottomed pressurized gas layer rises going from forward to aft.

6. The improved means for integrating a water propulsion system into a ship of claim 1 wherein the first bow oriented water propulsor further comprises a steering means wherein said steering means is, at least in its majority and with the ship moving forward and with the first bow oriented water propulsor producing forward thrust, disposed internal to the first open bottomed pressurized gas layer.

7. The improved means for integrating a water propulsion system into a ship of claim 1 wherein the first bow oriented water propulsor further comprises a thrust reversing means wherein said thrust reversing means is, when non-actuated and with the ship moving forward and with the first bow oriented water propulsor producing forward thrust, at least in its majority disposed internal to the first open bottomed pressurized gas layer.

8. The improved means for integrating a water propulsion system into a ship of claim 1 wherein a portion of the bow of the main center hull has, at least in part, a bulbous shape.

9. The improved means for integrating a water propulsion system into a ship of claim 1 wherein, as seen in a profile view, a majority of the bow of the main center hull slopes aft.

10. The improved means for integrating a water propulsion system into a ship of claim 1 wherein a portion of the bow of the main center hull has a shape that is wider in cross dimension horizontally than vertically.

11. The improved means for integrating a water propulsion system into a ship of claim 1 wherein said first bow oriented water propulsor is an electrically powered waterjet and which further comprises a first stern oriented waterjet propulsor wherein said first stern oriented waterjet propulsor is electrically powered.

12. The improved means for integrating a water propulsion system into a ship of claim 1 which further comprises a second recess inset upward into an underside of the main center hull of the ship.

13. In an improved means for integrating a water propulsion system into a ship, the improvement comprising:
a first bow oriented water propulsor having a first bow oriented water inlet disposed, at least in its majority, in a secondary bow disposed as a lower portion of a main bow of a main center hull of the ship and wherein, when the ship is moving forward and the first bow oriented water propulsor is operating, water taken into the first bow oriented water inlet generates a hydrodynamic force on a bow wave of said ship thereby reducing energy of said bow wave and wherein said first bow oriented water propulsor expels at least a majority of its discharge propulsive water aft into a first open bottomed recess in the main center hull of the ship and wherein said open bottom recess is pressurized with gas from an artificial gas pressurization means to thereby form a first pressurized gas layer in the underside of the main center hull of the ship and wherein the first bow oriented water propulsor further comprises a steering means wherein said steering means is, with the ship moving forward and with the first bow oriented water propulsor producing forward thrust, at least in its majority disposed internal to the first open bottomed pressurized gas layer in the main center hull of the ship.

14. The improved means for integrating a water propulsion system into a ship of claim 13 wherein said first open bottomed recess is, at least in part, defined either side longitudinally by downwardly extending longitudinal portions of the main center hull.

15. The improved means for integrating a water propulsion system into a ship of claim 13 wherein said first open bottomed recess is, at least in part, defined forward by a first step inset upward into a lower portion of the main center hull of the ship.

16. The improved means for integrating a water propulsion system into a ship of claim 13 which further comprises outrigger hulls disposed either side of the main center hull of the ship.

17. The improved means for integrating a water propulsion system into a ship of claim 14 wherein, as seen in a vertical transverse plane of the main center hull of the ship, a lower water contacting portion of the first open bottomed pressurized gas layer is horizontal over a least a majority of its width.

18. The improved means for integrating a water propulsion system into a ship of claim 13 wherein, as seen in a vertical longitudinal plane of the main center hull of the ship, a lower water contacting portion of the first open bottomed pressurized gas layer rises going from forward to aft.

19. The improved means for integrating a water propulsion system into a ship of claim 13 wherein as seen in a profile view, a majority of the main bow of the main center hull disposed above the secondary bow slopes aft.

20. The improved means for integrating a water propulsion system into a ship of claim 13 wherein the first bow oriented water propulsor further comprises a thrust reversing means wherein said thrust reversing means is, when non-actuated, with the ship moving forward and with the first bow oriented water propulsor producing forward thrust, at least in its majority disposed internal to the first open bottomed pressurized gas layer.

21. The improved means for integrating a water propulsion system into a ship of claim 13 wherein a portion of the secondary bow of the main center hull has, at least in part, a bulbous shape.

22. The improved means for integrating a water propulsion system into a ship of claim 13 wherein a portion of the secondary bow of the main center hull has a shape that has a greater horizontal dimension than vertical dimension.

23. The improved means for integrating a water propulsion system into a ship of claim 13 which further comprises a second recess inset upward into an underside of the main center hull of the ship.

24. In an improved means for integrating a water propulsion system into a ship, the improvement comprising:
a first bow oriented water propulsor having a first bow oriented water inlet disposed, at least in its majority, in a secondary bow disposed as a lower portion of a main bow of a main center hull of the ship and wherein, when the ship is moving forward and the first bow oriented water propulsor is operating, water taken into the first bow oriented water inlet generates a hydrodynamic force on a bow wave of said ship thereby reducing energy of said bow wave and wherein, as seen in a profile view, a majority of the main bow of the main center hull disposed above the secondary bow slopes aft.

25. The improved means for integrating a water propulsion system into a ship of claim 24 which further comprises outrigger hulls disposed either side of the main center hull of the ship.

26. The improved means for integrating a water propulsion system into a ship of claim 24 wherein the secondary bow has a greater horizontal dimension than vertical dimension.

27. The improved means for integrating a water propulsion system into a ship of claim 24 wherein said first bow oriented water propulsor expels at least a majority of its discharge propulsive force water aft into a first open bottomed recess in the main center hull of the ship and wherein said first open bottomed recess is, at least in part, defined either side longitudinally by downwardly extending longitudinal portions of the main center hull and wherein a first open bottomed pressurized gas layer is formed in said first open bottomed recess and wherein said pressurized gas layer is supplied with gas from artificial gas pressurization means.

28. The improved means for integrating a water propulsion system into a ship of claim 24 which further comprises a second recess inset upward into an underside of the main center hull of the ship.

* * * * *